US006973735B1

(12) United States Patent
Billiot

(10) Patent No.: US 6,973,735 B1
(45) Date of Patent: Dec. 13, 2005

(54) BOARD SPACING TOOL

(75) Inventor: Brian M. Billiot, Covington, LA (US)

(73) Assignees: Crescent City Licensing, LLC, New Orleans, LA (US); Poydras Street Licensing Company, LLC, New Orleans, LA (US)

( * ) Notice: Subject to any disclaimer, the term of this patent is extended or adjusted under 35 U.S.C. 154(b) by 157 days.

(21) Appl. No.: 10/142,261

(22) Filed: May 9, 2002

(51) Int. Cl.[7] .................................................. G01B 3/30
(52) U.S. Cl. ........................................................ 33/526
(58) Field of Search .......................... 33/526, 613, 645, 33/501, 518, 527, DIG. 20, 411, 646, 647

(56) References Cited

U.S. PATENT DOCUMENTS

| | | | | | |
|---|---|---|---|---|---|
| 112,780 | A | * | 3/1871 | Castle | 33/411 |
| 315,722 | A | * | 4/1885 | Campbell | 33/647 |
| 1,016,383 | A | * | 2/1912 | Wellman | 81/44 |
| 2,930,135 | A | * | 3/1960 | Rodtz, Sr. | 33/526 |
| 3,735,497 | A | | 5/1973 | Boettcher | |
| 4,473,100 | A | * | 9/1984 | Wheeler | 33/647 |
| 4,765,116 | A | * | 8/1988 | Shank | 33/518 |
| 4,793,068 | A | * | 12/1988 | Golkar | 33/526 |
| 4,850,114 | A | | 7/1989 | Vockins | |
| 4,930,225 | A | | 6/1990 | Phillips | |
| 4,953,341 | A | * | 9/1990 | Joos | 33/DIG. 20 |
| 4,955,142 | A | * | 9/1990 | Rieck | 33/526 |
| 5,201,130 | A | * | 4/1993 | Krchnak | 33/526 |
| 5,288,534 | A | | 2/1994 | Tavshanjian | |
| 5,293,694 | A | | 3/1994 | Swindle | |
| 5,560,117 | A | | 10/1996 | Tallman | |
| 5,642,568 | A | * | 7/1997 | Lapka | 33/526 |
| 6,347,459 | B1 | * | 2/2002 | Schmitt | 33/526 |
| 6,510,621 | B2 | * | 1/2003 | Camara et al. | 33/526 |
| 6,647,685 | B2 | * | 11/2003 | Annarella et al. | 33/526 |
| 6,769,191 | B1 | * | 8/2004 | Zusman | 33/526 |

* cited by examiner

*Primary Examiner*—Christopher W. Fulton
(74) *Attorney, Agent, or Firm*—Raymond G. Areaux; Lisa C. Velez

(57) ABSTRACT

A board spacing tool comprising a balanced handle defined by a geometrically-shaped body having a front-end portion and a rear-end portion wherein the rear-end portion has a rocking surface to lift a planar board spacing or wedging member perpendicularly coupled to the bottom surface of the balanced handle. The bottom surface of the balanced handle has a substantially straight front-end portion and a rear-end portion gradually curving upward to permit rocking thereon. The planar board wedging member is adapted to be wedged between two adjacent floor slats. To remove the tool, the balanced handle is rocked on the rocking surface to lift and raise the planar board wedging member. Thus, other carpenters' tools are not required to remove the tool when wedged.

42 Claims, 4 Drawing Sheets

BOARD SPACING TOOL

DESCRIPTION

1. Technical Field

The present invention relates to carpenters' tools and, more particularly, to a board spacing tool for use in laying hardwood floors or the like.

2. Background of the Invention

Wood has a natural tendency to expand and contract based on the temperature of a dwelling and/or the weather. In order to compensate for the expansion and contraction tendencies, wood floors are laid such that an expansion gap is typically created every 4 to 5 wood boards or slats. The expansion gap provides the necessary clearance for wood boards or slats to move or slide therebetween to prevent buckling of the wood floor.

Craftsmen skilled in wood floor laying have employed various techniques to create such an expansion gap. For example, one common practice is the use of washers placed between two adjacent wood boards or slats. However, one of the biggest drawbacks with washers is that they are simply awkward to use. For example, washers are not easy to remove and can roll or become dislodged. Since washers are not easy to remove, many wood floor installers try to use the least amount of washers to create the expansion gap. As a result, bowing along the expansion gap is sometimes formed.

Several apparatuses have been patented which are aimed at spacing tools for floors, tile or decks.

U.S. Pat. No. 3,735,497, issued to Boettcher, entitled "FLOORING SPACERS" discloses a floor spacing tool which includes a head, a medial portion and a bottom spacer tongue. The floor spacing tool is adapted to be removed using a claw hammer which may be inserted under the head of the spaced to pull the spacer out with ease.

U.S. Pat. No. 5,288,534, issued to Tavshanjian, entitled "HANDY, MULTI-PURPOSE INSTALLATION SPACERS" discloses a spacer having a platform with a straight spacer element formed on one side and a cross-shaped spacer element formed on the other side.

Other patents related to board spacers for decks include U.S. Pat. No. 5,560,117, issued to Tallman, entitled "DECK BOARD OR THE LIKE SPACER"; U.S. Pat. No. 4,930,225, issued to Phillips, entitled "DECK BOARD OR THE LIKE SPACER AND NAILING GUIDE"; and, U.S. Pat. No. 4,850,114, issued to Vockins, entitled "DECKING SPACER."

U.S. Pat. No. 5,293,694, issued to Swindle, entitled "DEVICES FOR FACILITATING THE LAYING OF TILE" discloses a device for laying tile.

As can be readily seen, there is a continuing need for a board spacing tool for use in laying wood floors which can be wedged between adjacent wood floor boards or slats and subsequently removed in a manner which minimizes, if not eliminates, the formation of imperfections in or damage to the new wood floors upon removal of such tool.

Additionally, there is a continuing need for a board spacing tool for use in laying wood floors which is uniquely designed to eliminate the need to use any carpenter's tools to remove the wedged board spacing tool and instead relies upon the force exerted by a heel of a foot or shoe in a walk-off removal process.

Moreover, there is a continuing need for a board spacing tool for use in laying wood floors which is uniquely designed with a balanced handle which has a bottom surface's front-end portion which lies essentially flat on top of or hovering over two adjacent wood floor boards or slats and a planar board spacing member perpendicularly coupled thereto; and a bottom surface's rear-end portion or rocking surface which is curved to permit rocking thereon to lift and remove or unwedge the planar board spacing member from between two adjacent boards or slats as the heel of a foot or shoe applies pressure onto an elevated discrete lifting pressure zone to rock the tool on its rocking surface.

As will be seen more fully below, the present invention is substantially different in structure, methodology and approach from that of prior carpenters' spacing tools.

SUMMARY OF THE INVENTION

The preferred embodiment of board spacing tool of the present invention solves the aforementioned problems in a straight forward and simple manner.

Broadly, what is provided is a board spacing tool which comprises: a balanced handle comprising a geometrically-shaped body having a bottom surface, said bottom surface having a substantially straight front-end portion adapted to lie flat on or hover over two adjacent wood floor boards or slats and a rear-end portion gradually curving upward; and, a planar board spacing member perpendicularly coupled to said front-end portion of said bottom surface.

The board spacing tool of the present invention contemplates a tool having a balanced handle which includes a bottom surface having a substantially straight front-end portion and a rear-end portion gradually curving upward; and, a top surface, having a front-end portion and a rear-end portion, which substantially tracks the bottom surface of the balanced handle.

The board spacing tool of the present invention further contemplates a unitary structure made of a material which has a low coefficient for friction so that the tool can be quickly removed without significant friction with the two adjacent wood floor boards or slats even though the tool is essentially tightly wedged between two adjacent and secured wood floor boards or slats.

The board spacing tool of the present invention further contemplates a balanced handle having an elevated discrete lifting pressure zone for the placement of a heel of a shoe or foot for a simple walk-off removal process wherein application of a force to the elevated discrete lifting pressure zone rocks the balanced handle rearward on the rocking surface and thus lowering the elevated discrete lifting pressure zone to lift the front-end portion and the planar board spacing or wedging member.

The board spacing tool of the present invention further contemplates a balanced handle which is made of a material which is adapted to absorb pressure applied by a heel of a shoe or foot during the simple walk-off removal process to the elevated discrete lifting pressure zone so that (1) the curved contour of the bottom rear-end surface or rocking surface does not become deformed or distorted after repeated use of the tool; and (2) imperfections are minimized, if not eliminated, from being created in the wood floor boards or slats.

The board spacing tool of the present invention further contemplates a balanced handle having two side surfaces perpendicular to the top and bottom surfaces which has a height that provides a sufficient amount of surface area to accommodate the placement of a thumb and forefinger. This arrangement allows for easy manipulation and insertion of the planar board spacing or wedging member so that the tool hovers over two adjacent wood floor boards or slats.

The board spacing tool of the present invention further contemplates a balanced handle with a bottom surface which is constructed and arranged to rock rearwardly on a rear-end portion thereof so as to automatically lift a front-end portion and the planar board spacing member perpendicularly coupled to the front-end portion of such bottom surface.

The present invention also contemplates a board spacing tool comprising: means for creating an expansion gap between two adjacent wood floor slats; and, means for balancing, supporting and lifting said expansion gap creating means wherein said balancing, supporting and lifting means includes a front-end portion having said expansion gap creating means coupled perpendicularly thereto and a rear-end portion having a means for rocking to lift said expansion gap creating means from between two adjacent wood floor slats when rocked rearward on said rocking surface.

Furthermore, the present invention contemplates a method of creating an expansion gap with the board spacing tool of the present invention. The method comprises the steps of: (a) during installation, placing the balanced handle, of the board spacing tool, flat on or hovering over two adjacent wood floor boards or slats; simultaneous with step (a) wedging the planar board spacing member, of the board spacing tool, between the two adjacent wood floor boards or slats; (c) repeating steps (a)–(b) every 10 to 20 inches; and, (d) during removal, rocking the balanced handle on the rear-end portion to lift the planar board spacing member. The distance (in the range of 10 to 20 inches) between the planar board spacing members is intended to prevent the wood floor boards or slats from bowing along the expansion gap between the two adjacent wood floor boards or slats.

The method further contemplates applying pressure via a heel of a shoe or foot on the elevated discrete lifting pressure zone.

Still further the present invention contemplates a kit of a plurality of board spacing tools. The board spacing tools of the kit may be adapted to be tied together via a chain or cable link.

In view of the above, it is a feature of the present invention to provide a board spacing tool which is easy to use.

Another feature of the present invention is to provide a board spacing tool which is simple structurally and thus simple to manufacture.

A further feature of the present invention is to provide a board spacing tool which is very lightweight to minimize, if not, eliminate any formation of imperfections in the wood floor boards or slats of the floor during installation, operation or removal.

A still further feature of the present invention is to provide a board spacing tool which is made of a slippery pressure absorbing material.

A still further feature of the present invention is to provide a board spacing tool which is made of a linear high density polyethylene material having a density of about 0.955 g/cm3 and a melt index in the range of 0.3–0.8 g/ten minutes.

A still further feature of the present invention is to provide a board spacing tool which facilitates the formation of an expansion gap while also facilitating the alignment of butt joints.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 7:
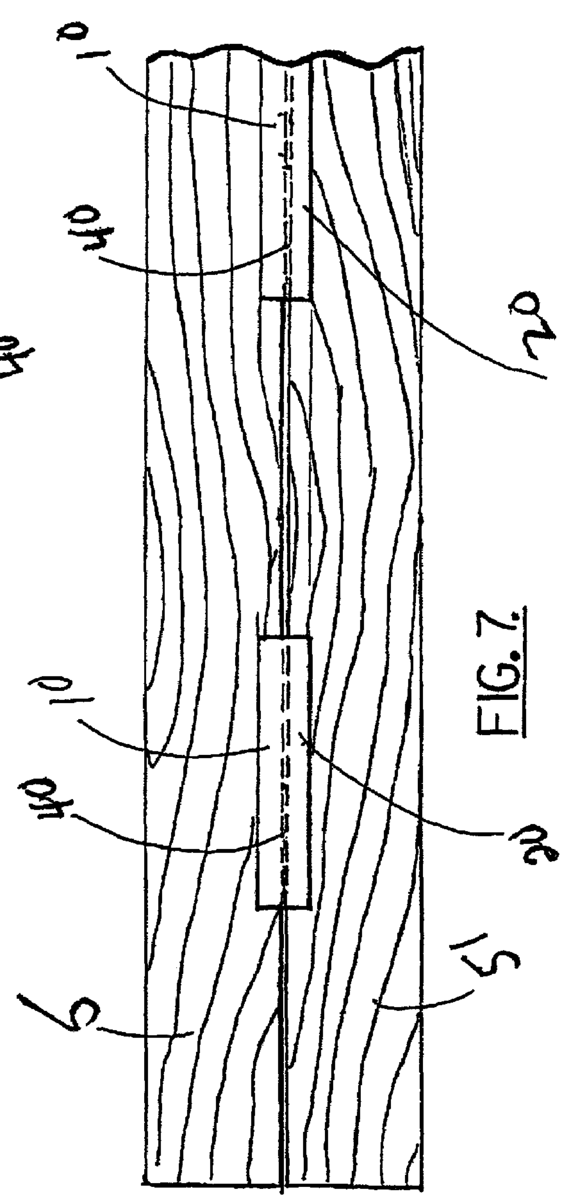
FIG. 7 illustrates a top view of a plurality of the board spacing tools employed in use.
Figure 8:
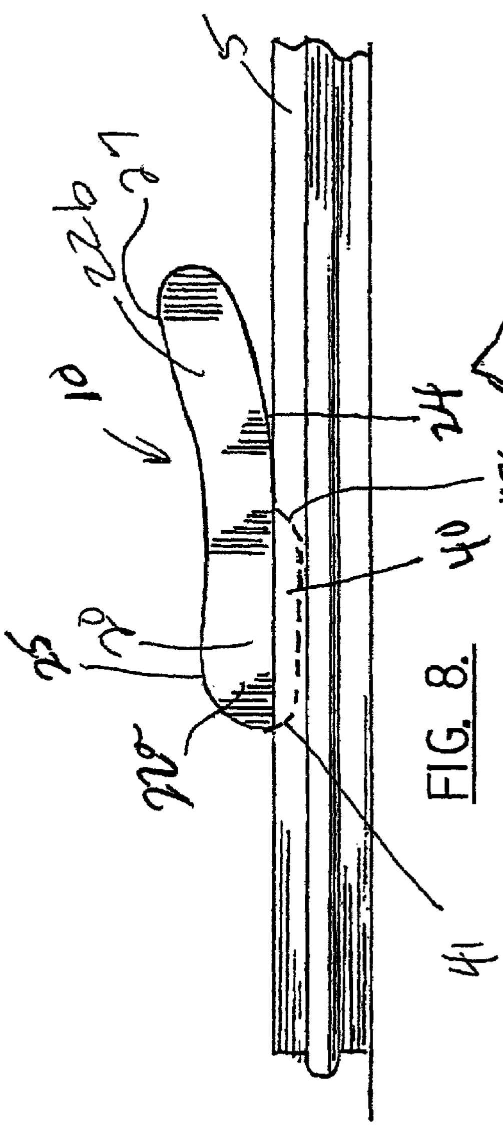
FIG. 8 illustrates a side view of one of the board spacing tools employed in use.
Figure 9:
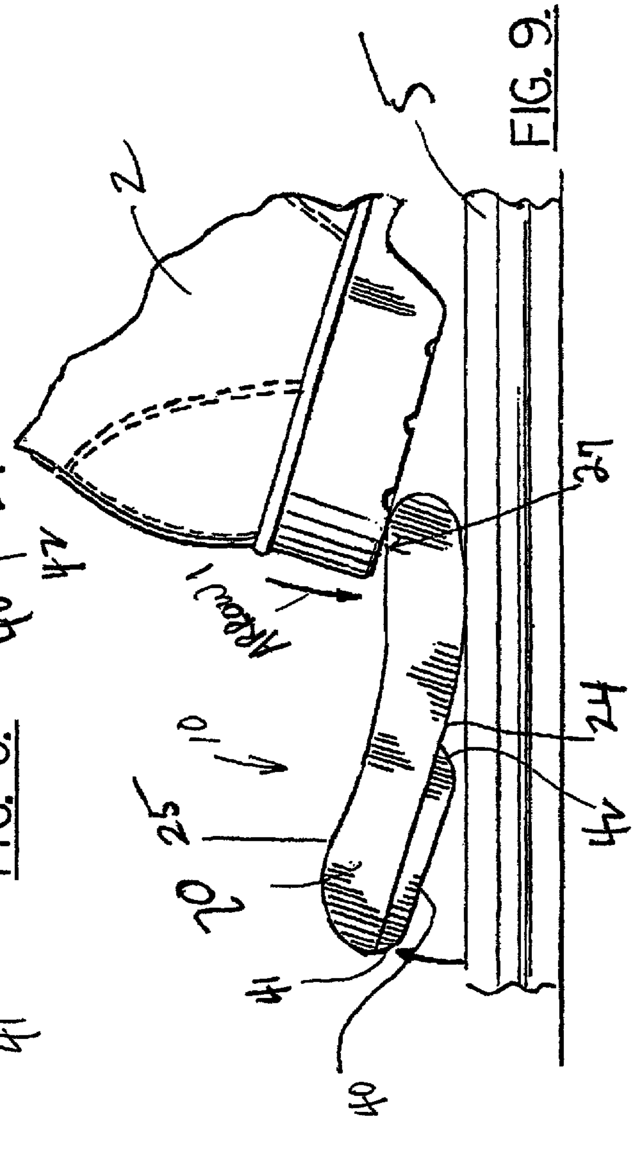
FIG. 9 illustrates a side view of one of the board spacing tools being removed and lifted; and, FIG. 10 illustrates a kit of an alternative embodiment of board spacing tools of the present invention.

Referring now to FIGS. 1–5, the board spacing tool of the present invention is designated by the reference numeral 10. The board spacing tool 10 is generally comprised of a balanced handle 20 and a planar board spacing or wedging member 40 perpendicularly coupled to an underside of the balanced handle 20. The planar board spacing or wedging member 40 is adapted to be inserted or wedged between two adjacent and parallel wood floor boards or slats 5 and 5', as best seen in FIGS. 7–9. The thickness T of the inserted planar board spacing or wedging member 40 provides the necessary expansion gap between adjacent and parallel wood floor boards or slats 5 and 5' to prevent buckling of the wood floor as the weather or temperature of a dwelling changes.

The balanced handle 20 comprises a geometrically-shaped body or structure which is essentially solid and has a rear-end portion **22*b* which gradually curves upward, the benefit of which is made clear from its operation described herein in detail below. The front-end portion 22*a* of the balanced handle 20 supports the planar board spacing or wedging member 40. The front-end portion 22*a* in combination with the planar board spacing or wedging member 40 has a body weight which is greater then the rear-end portion 22*b*. In other words, the front-end portion 22*a* is biased so that when the tool 10 hovers over two adjacent wood boards or slats 5 and 5' the front-end portion 22*a* remains flat on top of the wood floor boards or slats 5 and 5' without a tendency to rock rearward on the rocking surface of the rear-end portion 22*b***.

The geometrically-shaped body or structure of the balanced handle 20 is defined by a bottom surface 24 which has a substantially straight front-end portion **24*a* and a rear-end portion 24*b* generally curving upward permitting rocking thereon (sometimes hereinafter referred to as "the rocking surface"). The geometrically-shaped body or structure of the balanced handle 20 is further defined by a top surface 25 having a front-end portion 25***a* and a rear-end portion 25*b*, the rear-end portion 25*b* substantially tracks the rear-end portion 24*b* of the bottom surface 24.

Figure 1:
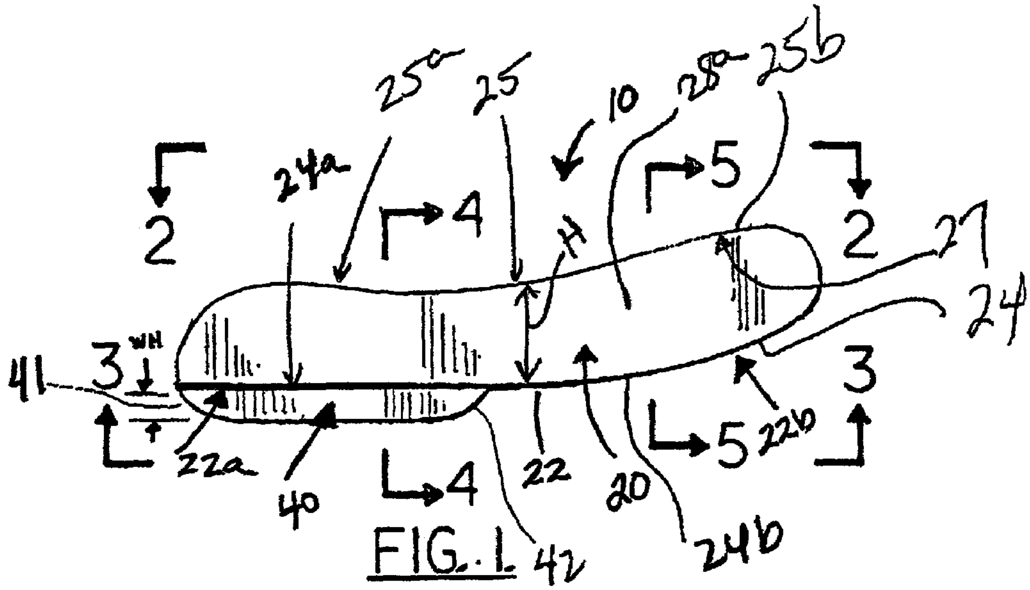
FIG. 1 illustrates a side view of the board spacing tool of the present invention.
Figure 2:
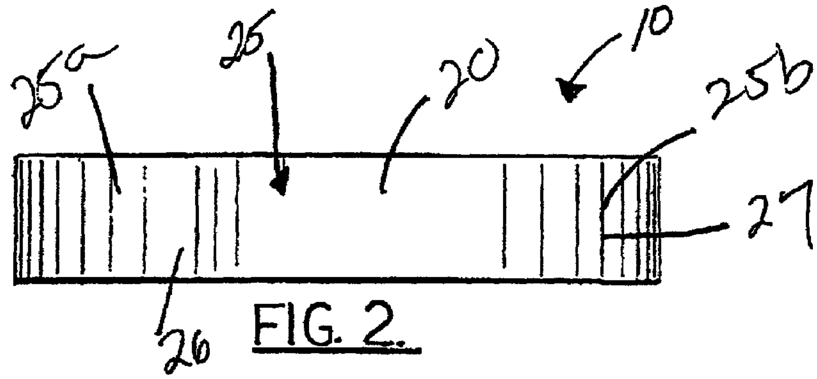
FIG. 2 illustrates a top view of the board spacing tool of the embodiment of FIG. 1.
Figure 3:
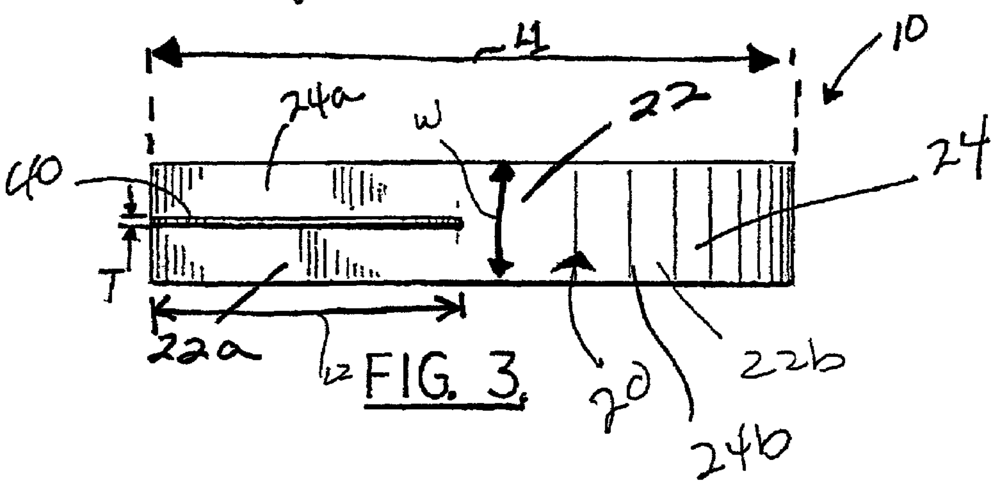
FIG. 3 illustrates a bottom view of the board spacing tool of the embodiment of FIG. 1.
Figure 6:
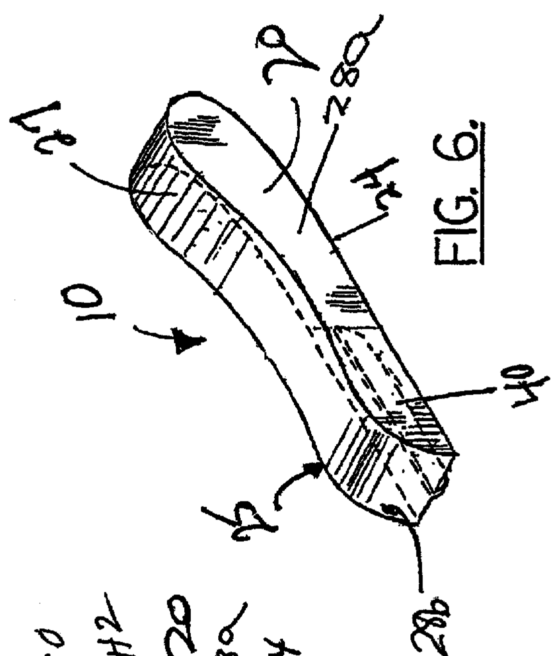
FIG. 6 illustrates a perspective view of the board spacing tool.
Figure 5:
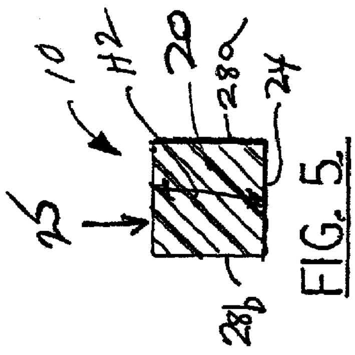
FIG. 5 illustrates a cross sectional view of the board spacing tool along the plane 5—5 of the embodiment of FIG. 1.
Figure 4:
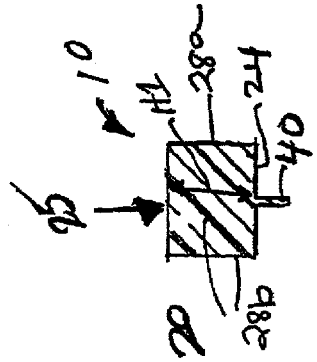
FIG. 4 illustrates a cross sectional view of the board spacing tool along the plane 4—4 of the embodiment of FIG. 1.

The geometrically-shaped body or structure of the balanced handle 20 is further defined by two side surfaces 28*a* and 28*b* perpendicular to the bottom and top surfaces 24 and 25 which have a height range H that provides a sufficient amount of surface area to accommodate the placement of a thumb and forefinger of the installer. As best seen in FIGS. 4 and 5, the height of the two side surfaces 28*a* and 28*b* varies slightly between H1 (approximately 9/16") and H2 (approximately 12/16") thus providing a range of heights or height range H. This allows for easy manipulation and insertion of the planar board spacing or wedging member 40 so that the tool 10 hovers over two adjacent wood floor boards or slats 5 and 5', as best seen in FIG. 7.

The bottom surface 24 is constructed and arranged to rock rearwardly on its rear-end portion 24*b* to automatically lift the front-end portion 24*a* and the planar board spacing or wedging member 40 as a force is applied to the elevated discrete lifting pressure zone or pad 27, as best seen in FIG. 9, such as by a heel of a foot or shoe. The rear-end portion 25*b* of the top surface 25 closely approximates the rear-end portion 24*b* of the bottom surface 24 and is curved. The end of the curvature of the rear-end portion 25*b* of the top surface 25 forms the elevated discrete lifting pressure zone or pad 27 above the plane of the front-end portion 24*a* of the bottom surface. Thus application of a force to the elevated discrete lifting pressure zone or pad 27 on the top surface 25 rocks the balanced handle 20 rearward on the rocking surface and thus lowers the elevated discrete lifting pressure zone to lift the front-end portion 24*a* and the planar board spacing or wedging member 40.

As shown in FIG. 9, the walk-off removal process includes simply applying a force in the direction of ARROW 1 created by the application of the installer's weight to the elevated discrete lifting pressure zone or pad 27, via a heel of a shoe 2 or foot, of each tool 10 and stooping to pick up the tool 10. The use of the weight of the installer is sufficient to overcome the friction fit coupling of the planar board spacing or wedging member 40 between two adjacent and secured wood floor boards or slats 5 and 5'.

In the exemplary embodiment, the rear-end portion 22*b* is slightly shorter than the front-end portion 22*a*. The board spacing tool 10 is balanced with the front load of the planar board spacing or wedging member 40. Thus, when the board spacing tool 10 is installed, the bottom surface's front-end portion 22*a* lies essentially flat on top of and hovers over the wood floor boards or slats 5 and 5' and remains stationary until a force is applied during the walk-off removal process. In other words, the balanced handle 20 remains stationary when the planar board spacing or wedging member 40 is installed, as best seen in FIG. 8, and does not have a tendency to rock on the rocking surface of the rear-end portion 22*b* which would lift the planar board spacing or wedging member 40 from the intended position.

In the preferred embodiment, the board spacing tool 10 is unitary and integral comprised of a single piece of a linear high density polyethylene material having a density of about 0.955 g/cm3 and a melt index in the range of 0.3–0.8 g/ten minutes, such as manufactured by Poly Hi Solidur Inc. and which is also sometimes known as Sanalite®. The linear high density polyethylene material is generally rigid and lightweight and contoured in the manner described below. The material of the board spacing tool 10 is adapted to absorb pressure applied by a heel of a shoe or foot during the walk-off removal process to the elevated discrete lifting pressure zone or pad 27 so that the curved contour of the bottom surface 24 does not become deformed or distorted after repeated use of the tool 10.

Nevertheless, in an alternate embodiment, the planar board spacing or wedging member 40 may be made of metallic material affixed to the balanced handle 20. In a still further embodiment, the balanced handle 20 may have a hollow interior.

In the exemplary embodiment, the length L1 of the balanced handle 20 is approximately 3¾–4 inches. The width W of the balanced handle 20 is approximately ¾ of an inch. The planar board spacing or wedging member 40 is a generally thin and rigid substrate which has a length L2 of approximately 1 11/16 inches between front edge 41 and back edge 42 and a thickness T of approximately 3/32 of an inch. However, the thickness T of the planar board spacing or wedging member 40 may vary based on the thickness of the wood floor boards or slats 5 being installed or application. For example, for interior wood floors, the thickness T of the planar board spacing or wedging member 40 may vary from 1/16" to ¼". Moreover, a larger version of the tool 10 can be used with deck floors. The height WH of the planar board spacing or wedging member 40 is limited to the distance between the top of the top flat surface or face of the wood floor boards or slats 5 and the top of the tongue so that the planar board spacing or wedging member 40 floats above the tongue of the wood floor boards or slats 5 when the tool 10 is installed.

The planar board spacing or wedging member 40 has a front edge 41 and a back edge 42 wherein the distance between the front edge 41 and the back edge 42 is the length L2. The back edge 42 is curved or truncated to eliminate that portion of the planar board spacing or wedging member 40 which may otherwise remain wedged between the wood floor boards or slats 5 and 5' when the planar board spacing or wedging member 40 is rocked on the rear-end portion 22*b* and lifted.

When installing wood floors, twenty (20) to thirty (30) board spacing tools 10 would be needed to properly create the expansion gap. For example, a board spacing tool 10 would be required every 12 to 18 inches. Generally, an expansion gap is created every four (4) to five (5) wood floor boards or slats 5. Thus, the twenty (20) to thirty (30) board spacing tools 10 may be provided in a kit having twenty (20) to thirty (30) board spacing tools 10.

Figure 10:
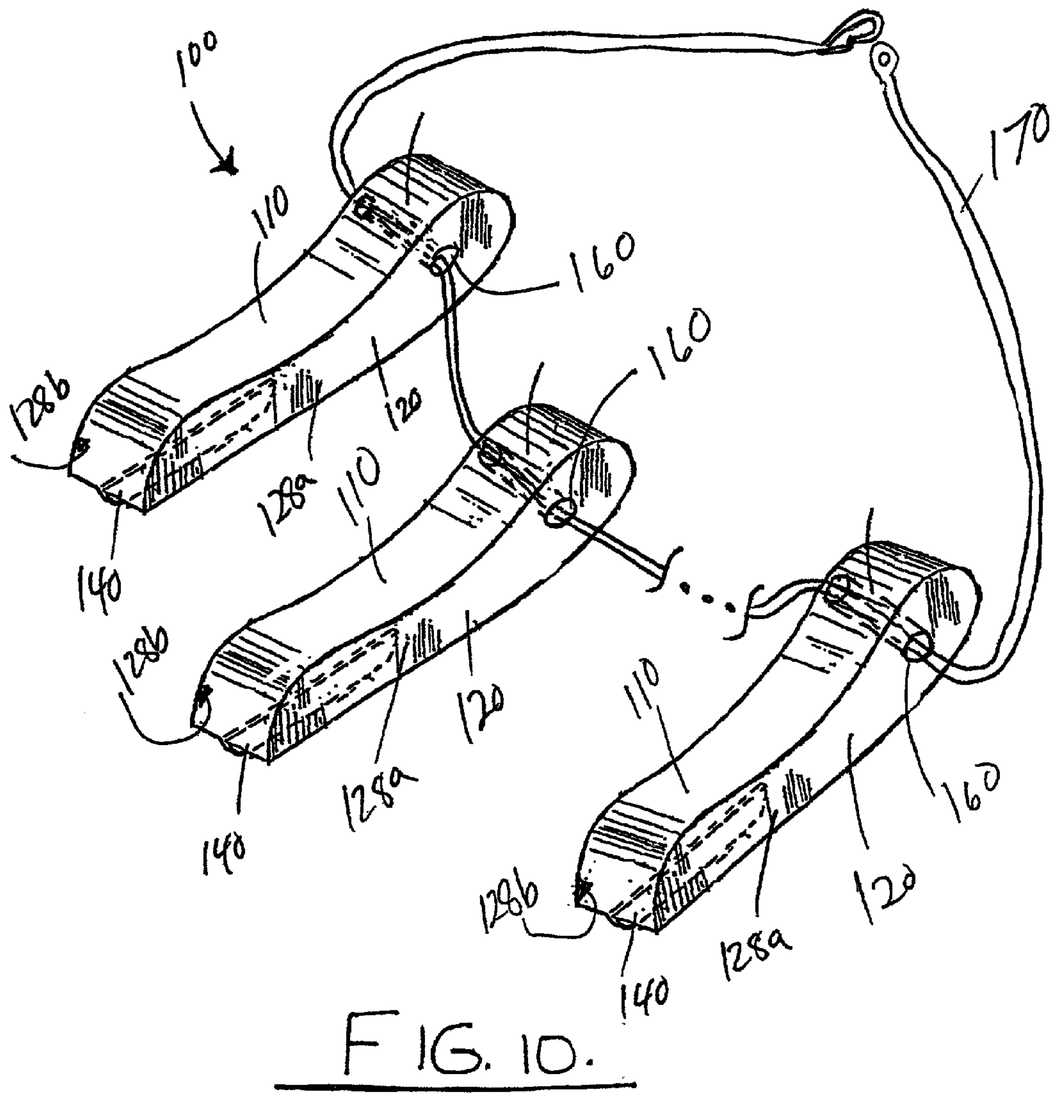

Referring now to FIG. 10, a kit 100 having a plurality of board spacing tools 110 is shown. The board spacing tool 110 differs from the board spacing tool 10 in that a bored hole 160 is added extending through the balanced handle 120 and the two side surfaces 128*a* and 128*b* so that twenty (20) to thirty (30) board spacing tools 110 can be tied together via a chain or other linking cable 170. The planar board spacing or wedging member 140 is shown in phantom.

It is noted that the embodiment of the board spacing tool described herein in detail, for exemplary purposes, are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A board spacing tool comprising:

(a) a balanced handle comprising a geometrically-shaped body having a bottom surface, said bottom surface having a substantially straight front-end portion adapted to lie flat on or hover over two adjacent wood floor slats and a rear-end portion gradually curving upward; and, (b) a planar board spacing member perpendicularly coupled to said front-end portion of said bottom surface.

2. The tool of claim 1, wherein the balanced handle further comprises a top surface having a front-end portion and a rear-end portion which substantially tracks said bottom surface.

3. The tool of claim 2, wherein an end of a curvature of said rear-end portion of said top surface defines an elevated discrete lifting pressure zone for application of a downward force directly thereto to lift said planar board spacing member as said balanced handle rocks on said rear-end portion of said bottom surface.

4. The tool of claim 2, wherein said balanced handle further comprises two side surfaces perpendicular to said top surface and said bottom surface.

5. The tool of claim 1, wherein said rear-end portion of said bottom surface is constructed and arranged to rock rearwardly thereon to automatically lift said front-end portion and said planar board spacing member.

6. The tool of claim 1, wherein said planar board spacing member is a thin and rigid substrate and has a thickness to provide an expansion gap between said two adjacent wood floor slats.

7. The tool of claim 1, wherein said balanced handle and said planar board spacing member are constructed of a linear high density polyethylene material.

8. The tool of claim 1, wherein said balanced handle and said planar board spacing member are integrally formed and made of a unitary and solid structure.

9. The tool of claim 8, wherein said unitary and solid structure is lightweight.

10. The tool of claim 1, wherein said balanced handle is balanced so that said balanced handle remains stationary and said front-end portion flat when said planar board spacing member is wedged between said adjacent wood slats.

11. The tool of claim 1, wherein said planar board spacing member is constructed and arranged to be completely lifted as the balanced handle is rocked rearward.

12. The tool of claim 1, wherein said balanced handle has formed therein a bored hole.

13. A method of creating an expansion gap with a board spacing tool of claim 1 comprising the steps of:

(a) during installation, placing said balanced handle, of said board spacing tool, flat on or hovering over two adjacent wood floor slats;

(b) simultaneous with step (a) wedging said planar board spacing member, of said board spacing tool, between said two adjacent wood floor slats;

(c) repeating steps (a)–(b) every 10 to 20 inches; and, (d) during removal, rocking said balanced handle on said rear-end portion and lifting said planar board spacing member.

14. The tool of claim 13, wherein:

said balanced handle comprises a top surface defining an elevated discrete lifting pressure zone; and, the step (d) includes the step of:

(d1) applying pressure via a heel of a shoe or foot on said elevated discrete lifting pressure zone; and, (d2) in response to step (d1), rocking said balanced handle on said rear-end portion and lifting said planar board spacing member.

15. The tool of claim 1, wherein the balanced handle further comprises a top surface having a rear-end portion above said rear-end portion of said bottom surface and wherein said rear-end portion of said top surface is comprised of a means for receiving a downward force directly thereto to lift said planar board spacing member as said balanced handle rocks on said rear-end portion of said bottom surface.

16. The tool of claim 1, wherein the balanced handle further comprises a top surface with a rear-end portion above said rear-end portion of said bottom surface and wherein said rear-end portion of said top surface is comprised of a means for lifting said planar board spacing member as a downward force is applied to said end of said curvature of said rear-end portion of said top surface and as said balanced handle rocks on said rear-end portion of said bottom surface.

17. The tool of claim 1, wherein said balanced handle has a front-end portion which is above said front-end portion of said bottom surface and a rear-end portion which is above said rear-end portion of said bottom surface and wherein a weight of said front-end portion of said balanced handle combined with a weight of said planar board spacing member exceeds a weight of said rear-end portion of said balanced handle.

18. The tool of claim 1, wherein said rear-end portion of said bottom surface is a rocking surface.

19. A board spacing tool comprising:

(a) means for creating an expansion gap between two adjacent wood floor slats; and, (b) means for balancing, supporting and lifting said expansion gap creating means wherein said balancing, supporting and lifting means includes a front-end portion having said expansion gap creating means coupled perpendicularly thereto and a rear-end portion having a means for rocking to lift said expansion gap creating means from between two adjacent wood floor slats when rocked.

20. The tool of claim 19, wherein said balancing, supporting and lifting means further comprises:

a top surface having a front-end portion and a rear-end portion;

a bottom surface having a substantially straight front-end portion adapted to lie flat on or hover over said two adjacent wood floor slats and a rear-end portion gradually curving upward defining said rocking means wherein said top surface substantially tracks said bottom surface.

21. The tool of claim 20, wherein a curvature of said rear-end portion of said top surface defines an elevated discrete lifting pressure zone for application of a force directly thereto to lift said expansion gap creating means as said balancing, supporting and lifting means rocks on said rocking means.

22. The tool of claim 20, wherein said balancing, supporting and lifting means further comprises two side surfaces perpendicular to said top surface and said bottom surface.

23. The tool of claim 19, wherein said expansion gap creating means is a thin and rigid substrate and has a thickness to provide an expansion gap between said two adjacent wood floor slats.

24. The tool of claim 19, wherein said balancing, supporting and lifting means and said expansion gap creating means are constructed of a linear high density polyethylene material.

25. The tool of claim 19, wherein said balancing, supporting and lifting means and said expansion gap creating means are integrally formed and made of a unitary and solid structure.

26. The tool of claim 25, wherein said balancing, supporting and lifting means has a bored hole formed therein.

27. The tool of claim 25, wherein said unitary and solid structure is lightweight.

28. The tool of claim 19, wherein a weight of said front-end portion combined with a weight of said expansion creating means exceeds a weight of said rear-end portion.

29. A board spacing tool comprising:

(a) a balanced handle comprising a geometrically-shaped body having a bottom surface and a top surface, said bottom surface having a substantially straight front-end portion adapted to lie flat on or hover over two adjacent wood floor slats and a rear-end portion gradually curving upward, said top surface tracking said bottom surface wherein an end of a curvature of said top surface defines an elevated discrete lifting pressure zone; and, (b) a planar board spacing member perpendicularly coupled to said front-end portion of said bottom surface wherein application of a downward force to said elevated discrete lifting pressure zone lifts said planar board spacing member as said balanced handle rocks on said rear-end portion of said bottom surface.

30. The tool of claim 29, wherein said balanced handle further comprises two side surfaces perpendicular to said top surface and said bottom surface.

31. The tool of claim 29, wherein said planar board spacing member is a thin and rigid substrate and has a thickness to provide an expansion gap between said two adjacent wood floor slats.

32. The tool of claim 29, wherein said balanced handle and said planar board spacing member are constructed of a linear high density polyethylene material.

33. The tool of claim 29, wherein said balanced handle and said planar board spacing member are integrally formed and made of a unitary and solid structure.

34. The tool of claim 33, wherein said unitary and solid structure is lightweight.

35. The tool of claim 29, wherein said balanced handle is balanced so that said balanced handle remains stationary and said front-end portion flat when said planar board spacing member is wedged between said adjacent wood slats.

36. The tool of claim 29, wherein said planar board spacing member is constructed and arranged to be completely lifted as the balanced handle is rocked rearward.

37. The tool of claim 29, wherein said balanced handle has formed therein a bored hole.

38. The tool of claim 29, wherein said rear-end portion of said bottom surface is a rocking surface.

39. A board spacing tool comprising:

(a) a balanced handle comprising a geometrically-shaped body having a bottom surface, said bottom surface (1) having a substantially straight front-end portion with a means for lying flat on or hovering over two adjacent wood floor slats and (2) having a rear-end portion gradually curving upward; and, (b) a planar board spacing member perpendicularly coupled to said front-end portion of said bottom surface.

40. The tool of claim 39, wherein said rear-end portion of said bottom surface is a rocking surface.

41. The tool of claim 39, wherein said balanced handle has a front-end portion which is above said front-end portion of said bottom surface and a rear-end portion which is above said rear-end portion of said bottom surface and wherein a weight of said front-end portion of said balanced handle combined with a weight of said planar board spacing member exceeds a weight of said rear-end portion of said balanced handle.

42. The tool of claim 39, wherein the balanced handle further comprises a top surface having a rear-end portion above said rear-end portion of said bottom surface and wherein said rear-end portion of said top surface is comprised of a means for receiving a downward force directly thereto to lift said planar board spacing member as said balanced handle rocks on said rear-end portion of said bottom surface.

* * * * *